Jan. 22, 1957   J. F. RISEWICK   2,778,061
TIRE VULCANIZING MOLD
Filed April 10, 1952
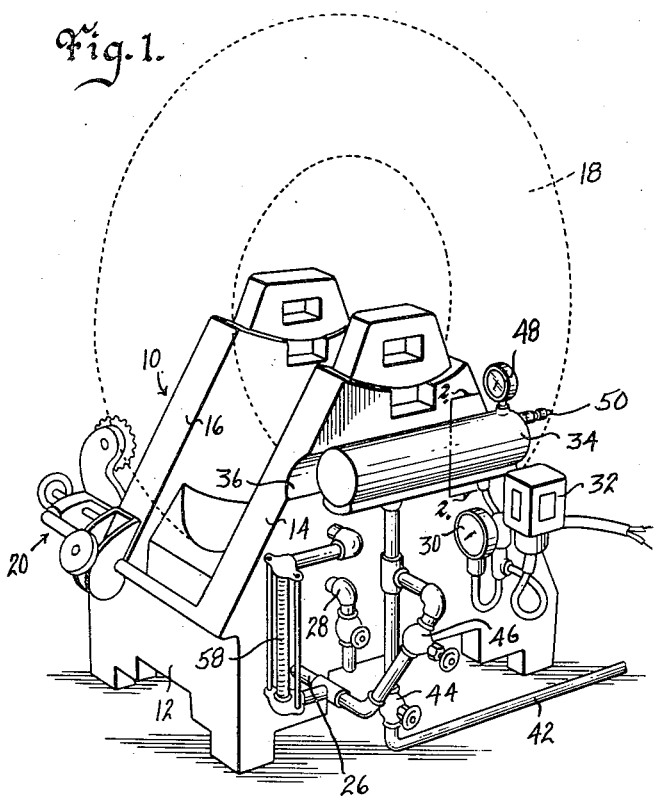
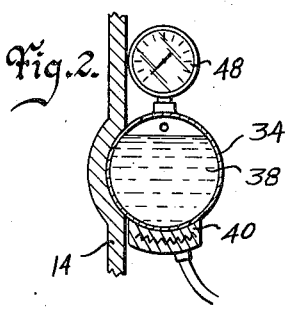
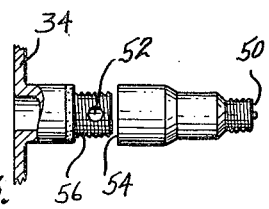
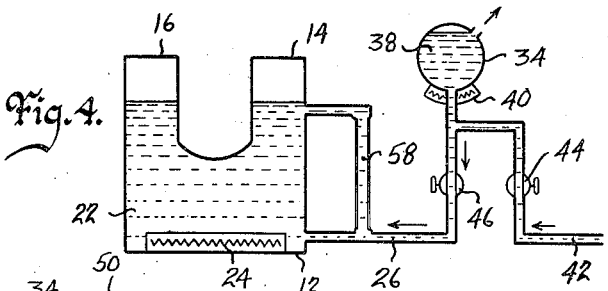
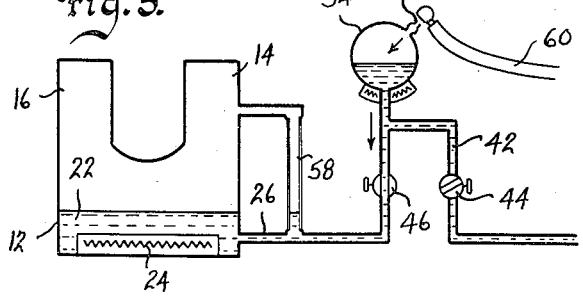
Inventor
John F. Risewick
by Talbert Dick & Adler
Attorneys
Witness
Edward P. Seeley

United States Patent Office 2,778,061
Patented Jan. 22, 1957

2,778,061
TIRE VULCANIZING MOLD
John F. Risewick, Oskaloosa, Iowa

Application April 10, 1952, Serial No. 281,606

6 Claims. (Cl. 18—18)

My invention relates to improvements in tire vulcanizing molds.

The use of tire vulcanizing molds, it will be appreciated, is not new and in general they consist of a tire retaining mold adjustable to accommodate tires of different sizes, and means for securely holding the tire during the vulcanizing process. Steam is usually provided for furnishing heat to the mold and for this purpose a water supply, varying in quantity with different size molds, is provided within the mold and supplied with heat by gas, electric or other suitable means. Such a mold with a limited self contained water supply is the type generally found in garages and the like using only a single unit and is the type with which my invention is more particularly concerned.

In operating a mold as described, steam must first be created from the water in the mold and this of course requires varying lengths of time depending upon the amount of water therein and the efficiency of the heating element. However, once the steam has reached the desired pressure, the mold is usable for a limited period determined by the water supply therein. When this supply has reached a point requiring replenishing, it is necessary to allow the mold to cool to reduce steam pressure therein before more water can be added. This cooling requires considerable time to which is added the time necessary to create steam pressure from the new supply with the result that in the interim the use of the mold is unavailable. Consequently, as a result of this time interval during which the mold cannot be used for productive work, the amount of actual vulcanizing accomplished in any one working day has more or less definite limitations for the myriads of business enterprises that find the need for one such mold essential but more than one as unnecessary for their overall volume of business.

With these problems in mind it is the general aim of my invention to provide a tire vulcanizing mold of the class having a self contained water supply from which steam is obtained, with a means for quickly replenishing this water supply without the need for cooling the mold to reduce the steam pressure therein.

More specifically my invention embodies the use with the mold of an auxiliary water supply reservoir from which water is moved by air pressure to the interior of the mold.

A further object of my invention is to provide a heating element for the reservoir so that the water temperature therein may be near that required for steam prior to movement into the mold whereby the time for converting it to steam thereafter is considerably reduced.

A still further object of this invention is to arrange the reservoir above described in such a position relating to the mold that in addition to having the auxiliary water supply therein heated by independent means, the water can receive heat by conduction from the mold itself, thus utilizing a source of heat for a purpose for which it was never intended and for which it has not so far been used in molds of the above class.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a perspective view of a tire vulcanizing mold embodying the use of my invention, Fig. 2 is a cross-sectional view taken on the line 2—2 of Fig. 1, Fig. 3 is an enlarged exploded view, partly in section of the combination air inlet valve and bleeder opening for the water supply reservoir of this device, Fig. 4 is a diagrammatic view of this device illustrating the arrangement of valves when water is initially being run to the mold, Fig. 5 is a diagrammatic view of this device illustrating the use of the water reservoir in replenishing the supply in the mold.

Referring to the drawings I have used the numeral 10 to generally designate a tire vulcanizing mold of a well known design comprising the base 12 and a pair of upstanding spaced apart sides 14 and 16 that form a compartment into which is placed a tire 18 that is to be vulcanized. The side 16 is laterally movable by any suitable means such as the gear mechanism 20 so that tires of different sizes can be accommodated. The base 12 is constructed to contain a supply of water 22 that is converted to steam by any suitable heating element 24. An inlet conduit 26 connects the interior of the base 12 to a source of water supply (not shown) and a steam release valve 28 is connected to the mold as illustrated in Fig. 1. A steam pressure gauge means 30 operatively connected to a control box 32 and the mold interior forms a part of the mold construction which so far described is well known in the art and for which no invention is claimed.

It will be apparent, however, in the structure outlined thus far that when the water supply 22 has been materially reduced, the steam pressure within the mold will be too great to permit the inlet of water through conduit 26 under normal water main pressure and thus in the present state of the art, the mold must be allowed to cool before water can be added. As pointed out earlier this cooling time and the heating period for the added water supply is time lost from the standpoint of productive use of the mold and it is in this respect that my invention has novelty and utility.

An auxiliary water supply tank or reservoir 34 is suitably mounted on and preferably in contact with one of the sides of the mold 10 and in this respect I show it on the side 14 which is stationary relative to the movable side 16. Also, I preferably provide a horizontal concave channel 36 on the outer side of the member 14 and the tank 34 is nested therein as illustrated in Fig. 2. My purpose in mounting the tank in direct contact with the mold is to utilize the heat from the mold for heating the water supply 38 by conduction to whatever extent that may be accomplished. A separate heating element 40 is provided for the tank 34 for bringing the water 38 to any desired temperature. A pipe or conduit 42 connects the tank 34 to a source of water supply under pressure (not shown) and a valve means 44 is interposed in this pipe line as illustrated. The pipe 26 from the mold connects to the pipe 42 intermediate the tank 34 and the valve 44 and a valve means 46 is placed in pipe 26 intermediate the mold and pipe 42.

An air pressure gauge 48 is associated with the reservoir 34, and also connected to the reservoir is a combination air inlet valve 50 and a bleeder opening or valve means 52 as shown in Fig. 3. The air valve 50 is provided with an internally threaded end 54 adapted to screw onto an externally threaded stub pipe 56 which protrudes from the tank and which contains the transverse opening 52. A transparent water level gauge 58 is mounted on the outer side of the mold to register the water level therein as shown in Fig. 1.

Thus constructed and arranged, this tire vulcanizing mold and my improvement therefor will operate in the following manner. When water is initially supplied to the mold as at the beginning of a working day, valves 44 and 46 will be open as shown in Fig. 4 and when the desired level has been reached according to gauge 58, these valves are closed. The water supply 22 is then converted to steam by heating element 24 and the mold is ready for use. In initially converting the water 22 to steam, experience has demonstrated that a shorter time is required if tank 34 is not allowed to be filled initially and this can be regulated by closing the valve 44 after the level in gauge 46 has reached a point that can easily be determined by experiment. Once the mold is in use, valve 46 is kept closed and the tank 34 can be filled by opening valve 44. The closure for the opening 52 can be released sufficiently to permit a bleeding action to serve as a gauge to indicate when the tank 34 is full and valve 44 should be closed.

During the normal use of the mold, the water 38 in the tank will be heated by conduction and if necessary, additional heat can be supplied by element 40 for the purpose of raising the water temperature in the tank near but not at that required for steam. When it becomes necessary to add more water to the mold, valve 46 is opened, valve 44 remaining closed, and air under pressure indicated by the hose 60 in Fig. 5 is applied to the valve 50. Obviously, this air pressure must be greater than that registering on gauge 30 so that water in the tank is forced through pipes 44 and 26 into the mold. Due to the preheating of the new water supply it will of course take little time to convert it to steam and consequently, the amount of time during a day that the mold can be used is considerably increased over present methods of operation. To refill tank 34, valve 44 is opened, valve 46 is closed and opening 52 provides an exhaust means for air under pressure previously delivered to the tank as well as indicating when the tank is full.

Some changes may be made in the construction and arrangement of my tire vulcanizing mold without departing from the real spirit and purpose of my invention, and it is my intention to cover by my claims, any modified forms of structure or use of mechanical equivalents which may be reasonably included within their scope.

I claim:

1. A water feed system for replenishing the water supply in the steam producing system of a tire vulcanizing mold while the mold is still heated from steam and steam pressure for vulcanizing requirements is still present therein, comprising, a water reservoir suitably mounted on said mold, said water reservoir having valved communication with the steam producing system of the mold and designed to have like communication with a source of water supply under ordinary main pressure, an air valve in said reservoir adapted for connection with a source of air pressure greater than that in the mold, and means for preheating the water in said water reservoir consisting of mounting the reservoir on said mold so as to receive heat therefrom by conduction.

2. A water feed system as defined in claim 1 wherein a channel is formed in the mold and said water reservoir is nested in part at least in said channel to receive heat therefrom by conduction.

3. In a tire vulcanizing mold of the class having a self contained capacity for a water supply and means for converting the water to steam together with a water feed system for supplying water to the mold while the mold is still heated from steam and steam pressure for vulcanizing requirements is still present therein, the combination therewith of a means in the water feed system for preheating the water before it enters the mold; said means comprising, a water reservoir in the water feed system, and said water reservoir mounted on the mold so as to receive heat therefrom by conduction.

4. In a tire vulcanizing mold of the class having a self contained capacity for a water supply and means for converting the water to steam together with a water feed system for supplying water to the mold while the mold is still heated from steam and steam pressure for vulcanizing requirements is still present therein, the combination therewith of a means in the water feed system for preheating the water before it enters the mold; said means comprising, a channel formed in the mold, and a water reservoir in the water feed system nested in part at least in said channel whereby heat passes by conduction from the mold to said reservoir.

5. In a tire vulcanizing mold having a steam producing system and a water feed system therefor, the combination therewith of a means in the water feed system for preheating the water before it enters the mold; said means comprising, a water reservoir in the water feed system, and said water reservoir mounted on the mold so as to receive heat therefrom by conduction.

6. In a tire vulcanizing mold having a steam producing system and a water feed system therefor, the combination therewith of a means in the water feed system for preheating the water before it enters the mold; said means comprising, a channel formed in the mold, and a water reservoir in the water feed system nested in part at least in said channel whereby heat passes by conduction from the mold to said reservoir.

References Cited in the file of this patent

UNITED STATES PATENTS

| | | |
|---|---|---|
| 1,056,013 | Dodson | Mar. 18, 1913 |
| 1,307,079 | Bongio et al. | June 17, 1919 |
| 1,404,120 | Hayward et al. | Jan. 17, 1922 |
| 2,060,638 | Schlosser | Nov. 10, 1936 |

OTHER REFERENCES

"Tire Servicing Equipment", by Heintz, James C. Heintz & Co., Cleveland, Ohio.